United States Patent
Davain et al.

(10) Patent No.: US 12,189,044 B2
(45) Date of Patent: Jan. 7, 2025

(54) METHOD FOR NAVIGATING A CARRIER DEVICE USING A KALMAN FILTER ESTIMATING A NAVIGATION STATE OF THE CARRIER DEVICE

(71) Applicant: Safran Electronics & Defense, Paris (FR)

(72) Inventors: Loïc Davain, Moissy-Cramayel (FR); Kévin Honore, Moissy-Cramayel (FR); Clément Misandeau, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 228 days.

(21) Appl. No.: 17/798,454

(22) PCT Filed: Feb. 19, 2021

(86) PCT No.: PCT/FR2021/050301
§ 371 (c)(1),
(2) Date: Aug. 9, 2022

(87) PCT Pub. No.: WO2021/165626
PCT Pub. Date: Aug. 26, 2021

(65) Prior Publication Data
US 2023/0094700 A1 Mar. 30, 2023

(30) Foreign Application Priority Data
Feb. 20, 2020 (FR) ........................................ 2001716

(51) Int. Cl.
*G01S 19/39* (2010.01)
*G01S 19/22* (2010.01)
*G01S 5/02* (2010.01)

(52) U.S. Cl.
CPC ............ *G01S 19/393* (2019.08); *G01S 19/22* (2013.01); *G01S 5/0294* (2013.01)

(58) Field of Classification Search
CPC .............................. G01S 19/393; G01S 19/22
(Continued)

(56) References Cited

U.S. PATENT DOCUMENTS

| 2008/0082266 A1* | 4/2008 | Bye .......................... G01S 19/22 701/472 |
| 2011/0084878 A1 | 4/2011 | Riley et al. |

(Continued)

FOREIGN PATENT DOCUMENTS

| CN | 110226108 A * | 9/2019 | ............. G01C 21/12 |
| FR | 3 107 588 B1 | 1/2022 | |

OTHER PUBLICATIONS

French Search Report for French Application No. 2001716, dated Nov. 3, 2020.

(Continued)

*Primary Examiner* — Harry K Liu
(74) *Attorney, Agent, or Firm* — BIRCH, STEWART, KOLASCH & BIRCH, LLP

(57) ABSTRACT

A method for navigating a carrier using a Kalman filter estimating a navigation state of a carrier, comprising: obtaining, from a signal transmitted by the satellite and subsequently received by the carrier, a delta range measured between the carrier and a satellite and another measured kinematic datum which is associated with the satellite, generating, from position data for the carrier and the satellite in the navigation state, an estimated delta range between the carrier and the satellite, calculating, using the delta ranges, a delta range innovation associated with the satellite, carrying out a test on the delta range innovation, the test result indicating whether or not the signal was a multi-path signal, (Continued)

using, by means of the filter, the kinematic datum as an observation to update the navigation state provided that the test result indicates that the signal was not a multi-path signal.

10 Claims, 2 Drawing Sheets

(58) Field of Classification Search
USPC .................................................. 342/357.23
See application file for complete search history.

(56) References Cited

U.S. PATENT DOCUMENTS

2012/0265440 A1* 10/2012 Morgan ............... G01C 21/165
701/472
2018/0095159 A1* 4/2018 Barrau .................... G06F 17/11

OTHER PUBLICATIONS

International Search Report for International Application No. PCT/FR2021/050301, dated May 12, 2021.
Manickam et al., "Using Tactical and MEMS Grade INS to Protect Against GNSS Spoofing in Automotive Applications", Proceedings of the 29th International Technical Meeting of the Ion Satellite Division, ION GNSS+ 2016 Portal Oregon Sep. 12-16, 2016 pp. 2991-3001.
Yeh et al., "Using Delta Range for Fault Detection/Exclusion on GPS Positioning", Asian Journal of Control, vol. 14. No. 4, Jul. 2012 (published online Oct. 28, 2011), pp. 936-946.
Zhu et al., "Demonstration of Integrity Protection for Multi-Constellation Carrier Phase Solution using RANSAC-based FDE", Proceedings of the 2019 International Technical Meeting, ION ITM 2019, Reston, Virginia, Jan. 28-31, 2019, pp. 744-761.

* cited by examiner

METHOD FOR NAVIGATING A CARRIER DEVICE USING A KALMAN FILTER ESTIMATING A NAVIGATION STATE OF THE CARRIER DEVICE

FIELD OF THE INVENTION

The present invention relates to the field of navigation methods using a Kalman filter.

BACKGROUND

A Kalman filter is a recursive estimator of data included in a state vector and evolving over time.

Such a filter is commonly used in a context of navigation of a mobile carrier device in space. In this case, the state vector contains dynamic data of the carrier device (for example: position, speed, acceleration, etc.). This method works by successive iterations, each iteration taking as input the state vector produced by the previous iteration.

Each iteration comprises two fundamental steps: a prediction step (also called propagation step), and an update step (also called readjustment step in some applications).

The update step is based on observations provided by sensors.

In particular, it has been proposed to use a GPS receiver as such a sensor. In this case, the Kalman filter uses as observations data originating from positioning signals emitted by different satellites, then received by the GPS receiver.

A signal emitted by one of the satellites can be reflected on an obstacle before reaching the carrier device (as indicated by the dotted arrow represented in FIG. 1). This obstacle can just as well be the ground, called "Ground Bounce", a building, or even the fuselage of the aircraft itself. In this case, the signal is said to have undergone a multi-path.

However, such a multi-path phenomenon introduces errors into the data used as observations by the Kalman filter. These errors affect the accuracy of the update performed by the Kalman filter to switch from an a priori state vector to an a posteriori state vector.

DISCLOSURE OF THE INVENTION

One aim of the invention is to estimate the navigation state of a carrier device based on data emanating from satellites, in a way that is more robust to errors.

For this purpose, it is proposed, according to a first aspect, a method for navigating a carrier device using a Kalman filter estimating a navigation state of the carrier device, the method comprising steps of:
  obtaining a delta range measured between the carrier device and a satellite and another measured kinematic data associated with the satellite, from a positioning signal emitted by the satellite then received by the carrier device,
  generating an estimated delta range between the carrier device and the satellite, from position data of the carrier device and the satellite, contained in the navigation state of the carrier device,
  calculating a delta range innovation associated with the satellite, using the estimated delta range and the measured delta range,
  carrying out a test on the delta range innovation, producing a test result indicating whether or not the positioning signal has followed a multi-path,
  using the kinematic data measured as an observation by the Kalman filter to update the navigation state of the carrier device, provided that the test result indicates that the positioning signal did not follow a multi-path.

The method according to the first aspect can also comprise the following optional characteristics, taken alone or combined together when this is technically possible.

Preferably, the kinematic data associated with the satellite is a pseudo-distance between the carrier device and the satellite.

Preferably, the measured delta range is not used by the Kalman filter to update the navigation state of the carrier device.

Preferably, the method further comprises the steps of:
  calculating a second innovation associated with the satellite, the second innovation relating to the measured kinematic data,
  carrying out a test on the second innovation associated with the satellite, producing a second test result indicating a level of likelihood of the measured kinematic data, the second test result also conditioning the use of the kinematic data measured by the Kalman filter to update the navigation state of the carrier device.

Preferably, the test on the second innovation associated with the satellite, or even the calculation of the second innovation, is implemented only on condition that the test result produced by the test on the delta range innovation indicates that the positioning signal did not follow a multi-path.

Preferably, the delta range innovation test comprises steps of:
  calculating a term depending on a deviation between the delta range innovation associated with the satellite and a covariance of the delta range innovation associated with the satellite, and
  making a comparison between the calculated term and a predefined threshold, the test result being a function of the comparison.

Preferably, the generation of the estimated delta range comprises steps of:
  calculating a distance between the carrier device and the satellite at a time t, from position data of the carrier device and the satellite, contained in a navigation state of the carrier device associated with the time t,
  making an inverse prediction by the Kalman filter from the navigation state of the carrier device at the time t, so as to obtain a navigation state of the carrier device associated with the time t−ΔT,
  calculating a distance between the carrier device and the satellite at a time t−ΔT, from position data of the carrier device and the satellite, contained in the navigation state of the carrier device associated with the time t−ΔT,
  calculating a deviation between the distance between the carrier device and the satellite at the time t, and the distance between the carrier device and the satellite at the time t−ΔT.

Preferably, the Kalman filter implements a tight inertial/satellite hybridization.

There is also proposed, according to a second aspect, a computer program product comprising program code instructions for the execution of the steps of the method according to the first aspect, when this program is executed by a computer.

There is also proposed, according to a third aspect, a navigation system comprising:

a processing unit configured to execute the program according to the second aspect, a receiver configured to receive the positioning signal.

DESCRIPTION OF THE FIGURES

Other characteristics, aims and advantages of the invention will emerge from the following description, which is purely illustrative and not limiting, and which must be read in relation to the appended drawings in which.

In all the figures, similar elements bear identical references.

DETAILED DESCRIPTION OF THE INVENTION

Navigation System

Figure 1:
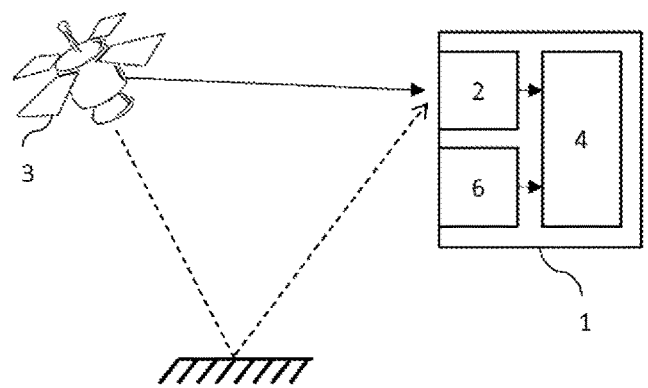
FIG. 1 schematically illustrates a navigation system according to one embodiment.

Referring to FIG. 1, a navigation system 1 of a mobile carrier device in space comprises a receiver 2 and a processing unit 4.

The carrier device is can be of any type: it can be a land vehicle, a ship or an aircraft.

The receiver 2 is adapted to receive and process positioning signals previously emitted by satellites 3 organized in a constellation (GPS, GALILEO, etc.). The receiver 2 is known per se.

The receiver 2 typically comprises at least one antenna for receiving the signals, and a chain for processing these signals operating in three phases: an acquisition phase, a code error tracking phase (DLL), and a phase error tracking phase (PLL). This processing chain comprises in particular a loop filter and uses a replica signal which is correlated to the received signal. The processing unit 4 is configured to implement a carrier device navigation method using a Kalman filter.

The processing unit 4 comprises for this purpose at least one processor configured to execute a program comprising code instructions for the implementation of the navigation method.

The navigation system further comprises an inertial measurement unit 6 configured to provide inertial data from the carrier device to the processing unit 4. The inertial measurement unit 6 is conventional: it comprises gyrometers and accelerometers (typically three of each type).

Discussion on the Form of the Signals Received and the Notions of Delta Range and Pseudo-Distance A signal received by the receiver 2 is a C/A signal intended for civilians on the frequency band L1=1575.42 MHz. Each signal is encoded by a PRN code, and includes a sample of information. More particularly, these different components of the signal are characterized as follows.

The PRN code is defined by a code length of 1,023 bits (chips), at a frequency of 1.023 Mcps, and each bit modulated by a rectangular waveform. The duration of a PRN code is therefore 1 ms. This period is denoted $T_R$.

The information bits are periodic and modulated by a rectangular waveform.

The form of the signal as emitted by a satellite is as follows:

$$s(t) = A^* d(t)^* c(t)^* \cos(2\pi f_{L1} t)$$

With:

A the amplitude of the signal
d(t) the information carried by the signal
c(t) the PRN code
$f_{L1}$ the frequency of the band L1, frequency of the carrier device The corresponding signal received by the receiver 2 is as follows:

$$s_R(t) = A^* d(t-\tau)^* c(t-\tau)^* \cos(2\pi f_{L1} t + \varphi)$$

With:

$\tau$ the wave propagation delay,
$\varphi$ the phase of the signal dependent on the doppler shift and on the wave propagation delay.

In order to calculate the distance between the receiving antenna and the satellite 3, the delay must be estimated. This delay estimation is often done on the PRN code. However, this delay characterizes the path of the wave but is also affected by multiple errors such as ionospheric errors, tropospheric errors, multi-paths, measurement errors, clock drifts or even thermal noise. Thus, the distances resulting from the calculation of these delays are real distances added to multiple errors and are thus called "pseudo-distances".

A pseudo-distance can be determined using the PRN component of the signal or using the phase of the signal. In the present disclosure:

Code pseudo-distance is the following measurement:

$$P_c^i(k) = \rho^i(k) + c(\Delta t_u(k) - \Delta t^i(k)) + d_I^i(k) + d_T^i(k) + D_{MULT}^i(k) + n^i(k) + b_P^i(k)$$

Phase pseudo-distance is the following measurement:

$$\varphi_c^i(k) = \rho^i(k) + c(\Delta t_u(k) - \Delta t^i(k)) - d_I^i(k) + d_T^i(k) + \varphi_{MULT}^i(k) + N^i \lambda^i + n^i(k) + b_\varphi^i(k)$$

with:

$\rho^i(k)$ the actual distance
c the speed of light
$\Delta t_u(k)$ the drift of the clock of the receiver 2
$\Delta t^i(k)$ the drift of the satellite clock
$d_I^i(k)$ the ionospheric delay
$d_T^i(k)$ the tropospheric delay
$\varphi_{MULT}^i(k)$ and $D_{MULT}^i(k)$ the phase and code errors of the multi-paths
$b_P^i(k)$ and $b_\varphi^i(k)$ code and phase biases
$n^i(k)$ the noise
$N^i \lambda^i$ represents the ambiguity associated with the phase measurement ($\lambda^i$ is the wavelength of the signal).

The receiver 2 is thus configured to produce the pseudo-distance between the carrier device and the satellite 3 of one of the two types mentioned above, based on the signal it receives from this satellite 3, typically the code pseudo-distance.

Furthermore, in a manner known per se, a "delta range" between the carrier device and a satellite is a data closely linked to the Doppler frequency of a positioning signal received by the receiver 2 and emanating from the satellite 3 in question. In reality, a delta range is comparable to a phase pseudo-distance.

The following equations are indeed obtained:

$$ID(t) = \int_{t_0}^{t} f_d(u) du$$

$$DR(t) = ID(t) - ID(t - \Delta T)$$

$$DR(t) = \int_{t-\Delta T}^{t} f_d(u) du$$

In the equations above, $f_d$ is the Doppler frequency of the signal received by the receiver 2, ID designates the known notion of "integrated Doppler", and $\Delta T$ is a period of observation of the delta ranges. Moreover, to is the time of the beginning of the phase tracking.

There is also a relation between a delta range and the distance between the carrier device and the satellite 3 in question, since:

$$DR(t) = \left(\frac{1}{\lambda}\right) * (\rho(t) - \rho(t - \Delta T))$$

Where $\rho(t) = |pos_{sat}(t) - pos_{ant}(t)|$ is the distance between the satellite 3 and the antenna at the time t and where $\lambda$ is the wavelength of the signal received by the receiver 2.

General Principle of a Kalman Filter

Figure 2:
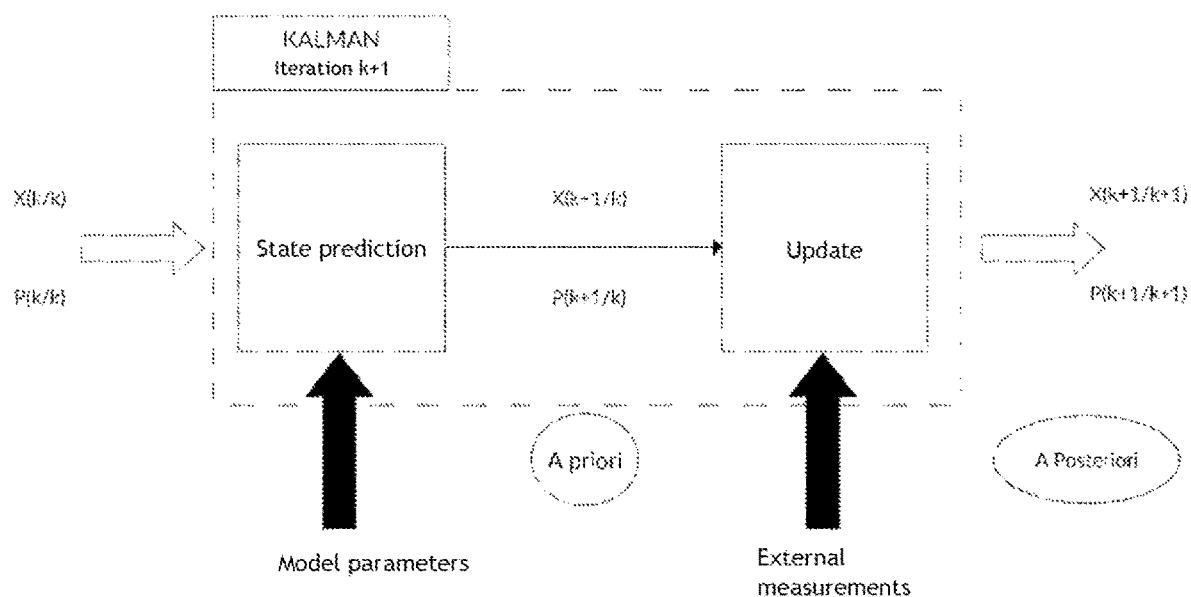
FIG. 2 is a block diagram describing the general operating principle of a Kalman filter.

Referring to FIG. 2, a Kalman filtering is a method for recursively estimating data included in a state vector and evolving over time (this state vector is also more simply called "state"). These data are dynamic data (position, speed, acceleration, etc.). This method works by successive iterations, each iteration taking as input the state vector produced by the previous iteration.

Each iteration comprises two fundamental steps: a prediction step (also called propagation step), and an update step (also called readjustment step in some applications).

The prediction step transforms a state vector X(k/k) into an a priori state vector X(k+1/k) by using a transition model which models the movement of the carrier device between the time k and the time k+1.

Also associated with the state vector X(k/k) is a covariance matrix P(k/k). This covariance matrix can be seen as representative of an uncertainty on the estimation constituted by the state vector X(k/k). The prediction step also transforms the covariance matrix P(k/k) into a covariance matrix P(k+1/k), based on the transition model.

The update step transforms the a priori state vector X(k+1/k) into an a posteriori state vector X(k+1/k+1) based on external measurements which are called "observations", and by combining these observations with an observation model that models the noise to which these observations are subject. During the update step, the covariance matrix P(k+1/k) is transformed into a covariance matrix P(k+1/k). The observations provide additional information, thus improving the estimation constituted by the a priori data X(k+1/k) and P(k+1/k). This is how the a posteriori state X(k+1/k+1) can also be more trusted. This can be seen graphically by a "decrease of P" between the a priori state and the a posteriori state.

The temporal behavior of the actual state vector and its observation is modeled by the following linear equations:

$$\begin{cases} X_{k+1} = F_k \cdot X_k + G_k \cdot U_k + W_k \\ Y_k = H_k \cdot X_k + V_k \end{cases}$$

With:
$X_k$ the actual state vector, which is sought to be estimated
$Y_k$ the measurement vector
$F_k$ the state transition matrix
$U_k$ the control vector
$G_k$ the control matrix
$H_k$ the observation matrix
$W_k$ the state noise (of covariance Qk=Cov(Wk))
Vk the measurement noise vector (of covariance Rk=Cov (Vk))

In this case then, the a priori and a posteriori states described previously are obtained thanks to the following relations:

Prediction:

$$\hat{X}_{k+1|k} = F_k \cdot \hat{X}_{k|k} + G_k \cdot U_k$$

$$P_{k+1|k} = F_k \cdot P_{k|k} \cdot F_k^T + Q_k$$

Kalman Gain:

$$K_{k+1} = P_{k+1|k} \cdot H_{k+1}^T * (H_{k+1} \cdot P_{k+1|k} \cdot H_{k+1}^T + R_{k+1})^{-1}$$

Updates:

$$\hat{X}_{k+1|k+1} = \hat{X}_{k+1|k} + K_{k+1} * (Y_{k+1} - H_{k+1} \cdot \hat{X}_{k+1|k})$$

$$P_{k+1|k+1} = P_{k+1|k} - K_{k+1} * (H_{k+1} \cdot P_{k+1|k})$$

With: $\hat{X}_k$ the estimated state vector.

Most of the time, the system cannot be modeled by linear equations. In this case then, the traditional Kalman filter cannot be applied. An Extended Kalman Filter (or EKF) is then used. In this case, the Extended Kalman Filter method proposes to bring the system back to the case of the traditional Kalman filter by linearizing and discretizing the equations near the estimated solution.

Configuration of the Kalman Filter Used in the Navigation System

The navigation state estimated by the Kalman filter used by the system 1 is a vector calculated at times $t_K$ (navigation filter processing times) comprising the following data:

Navigation states such as:
$\hat{r}_{ant}(t_K)$ the estimated position of the carrier device (more specifically of the antenna of the receiver 2) at the time $t_K$;
$\hat{v}_{ant}(t_K)$ the estimated speed of the carrier device at the time $t_K$
$\hat{\phi}_{ant}(t_K)$ the estimated attitude of the carrier device at the time $t_K$ Optionally, states describing the accuracy and the behavior of the reference navigation means, such as, for example, for an inertial reference:
The accelerometer biases
The gyrometer drifts Observation states such as:
$\hat{b}_t(t_K)$ the estimated clock bias at the time $t_K$;
$\hat{b}_{Channel,i}(t_K)$ the channel biases associated with the different satellites.

Furthermore, the Kalman filter of the system 1 uses as observations at a time $t_K$ at least two different data for each satellite of the constellation: a "delta range" between the carrier device and the satellite 3, and another kinematic data associated with the satellite 3. These observation data are often dated from a time different from $t_K$. The observation dating time is denoted $t_r$. It is the radio-navigation data receiving time.

In the following, one embodiment is described in more detail in which this other kinematic data is a pseudo-distance between the carrier device and the satellite 3 in question.

The data processed as observations by a conventional Kalman filter are used to update the a priori state vector that is to say to produce an a posteriori state vector taking into account such observations.

Unconventionally, a pseudo-distance between the carrier device and a satellite, having been measured by the receiver 2, is not always used by the Kalman filter of the system 1 to update the a priori state vector. It will be seen that this use for the update is conditional on the result of an innovation test involving a delta range between the carrier device and the same satellite, also measured by the receiver 2.

Another (optional) specificity of the Kalman filter used by the system 1 is that the delta range measured by the receiver 2 between the carrier device and a given satellite is not used to implement such an update. The role of the delta range is then limited to conditioning the use of the pseudo-distance in the update.

The Kalman filter is further configured to implement a tight satellite/inertial coupling. In other words, the Kalman filter uses not only data emanating from the receiver 2, and particularly pseudo-distances, but also inertial data provided by the inertial measurement unit 6. These inertial data mainly allow maintaining the navigation which will be readjusted by the observations.

Navigation Method Implemented Using the Kalman Filter

Figure 3:
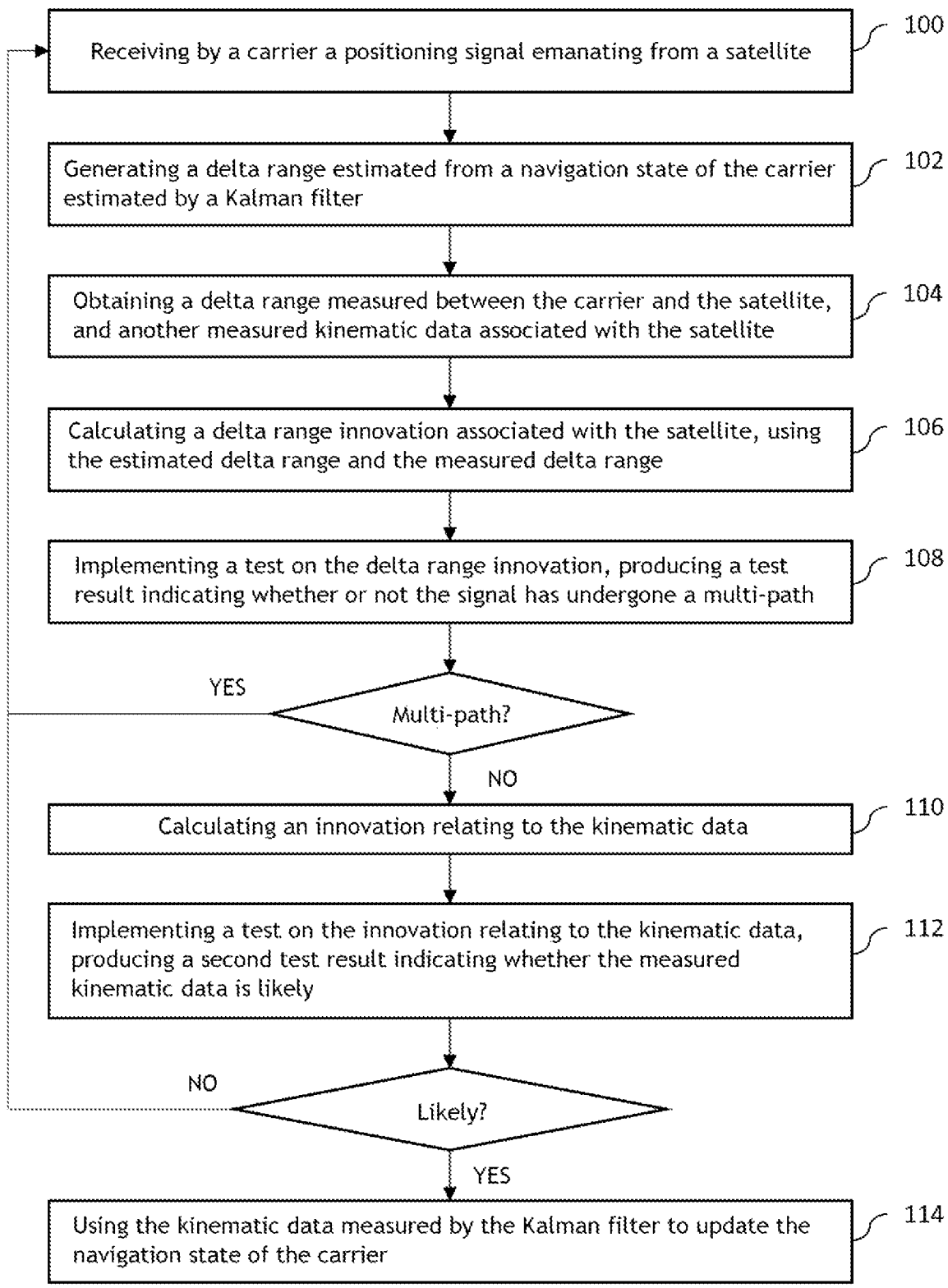
FIG. 3 is a flowchart of steps of a navigation method according to one embodiment.

Referring to FIG. 3, a method implemented by the system comprises the following steps. It is assumed that an a priori state vector associated with the time $t_K$ has been produced during an implementation by the Kalman filter of the prediction step discussed above.

The processing unit 4 generates an estimated delta range between the carrier device and the satellite 3 at the time $t_K$, from the content of the a priori state vector associated with the time $t_K$ (step 102). Without loss of generality, it is assumed in the following that the navigation filter is synchronous with the radio-navigation data. The navigation dating times $t_K$ are therefore considered equal to the observation data receiving times $t_r$.

Considering the estimated position of the satellite at the signal emission time $\hat{r}_{sat}(t_e)$, the estimated delta range is calculated as follows:

$$DR_{est}(t_r) = 1/\lambda \Big[ \sqrt{[\hat{r}_{ant}(t_r) - \hat{r}_{sat}(t_e)]^T [\hat{r}_{ant}(t_r) - \hat{r}_{sat}(t_e)]} -$$
$$\sqrt{[\hat{r}_{ant}(t_r - \Delta t) - \hat{r}_{sat}(t_e - \Delta t)]^T [\hat{r}_{ant}(t_r - \Delta t) - \hat{r}_{sat}(t_e - \Delta t)]} +$$
$$\hat{b}_t(t_r) - \hat{b}_t(t_r - \Delta t) \Big]$$

$\Delta t$ is here the duration between two Kalman cycles (two readjustments).

It is noted here that certain terms intervening in the calculation of the estimated delta range relate to past data associated with the time spent $t_r - \Delta T$.

To obtain these past data, the state vector associated with the time $t_r$ is the subject of an inverse prediction by the Kalman filter, so as to obtain a state vector in the past at the time $t_r - \Delta T$.

Using the equations of a Kalman filter, the prediction equation is written:

$$\hat{X}_{k+1|k} = \Phi_k \cdot \hat{X}_{k|k}$$

The matrix $\Phi_k$ is noted the transition matrix. Thus, in order to switch from a state $\hat{X}_{k+1|k}$ to a state $\hat{X}_{k|k}$, the inverse prediction is performed by a multiplication by the inverse transition matrix $\Phi_k^{-1}$:

$$\hat{X}_{k|k} = \Phi_k^{-1} \cdot \hat{X}_{k+1|k}$$

The processing unit 4 also obtains a delta range measured between the carrier device and the satellite 3 at the time t (step 104). The measured delta range is provided by the receiver 2, which determines this measurement, according to a known method, based on the positioning signal received by the receiver 2 and emanating from the satellite in question. The receiver 2 is based in particular on the phase of the received signal to determine this measured delta range.

The processing unit 4 also obtains during step 104 a pseudo-distance measured between the carrier device and the satellite 3 at the time $t_r$. The measured pseudo-distance is provided by the receiver 2, which determines this measurement, according to a known method, based on the positioning signal received by the receiver 2 and emanating from the satellite in question.

At this stage, the a priori state vector has not yet been updated by the Kalman filter, and two observations have been obtained for a given satellite and for a time $t_r$: a delta range between the carrier device and the satellite 3, and a pseudo-distance between the carrier device and the satellite 3.

Before performing this update, the following steps are implemented by the processing unit 4. The components of the observation matrix H are determined by the processing unit 4 by calculating the Jacobian matrix of the following term:

$$Zp_{inno}(t_r) = DR_{mes}(t_r) - DR_{est}(t_r)$$

A delta range innovation associated with the satellite 3 is then calculated by the processing unit 4 (step 106). This innovation is calculated as follows, using the a priori state vector dX, the observation matrix H and the previous term $Zp_{inno}(t_r)$:

$$\text{Inno} = Zp_{inno}(t_r) - H(t_r) \cdot dX(t_r)$$

$$\text{Cov}_{inno} = H \cdot P \cdot H^T + R$$

A covariance of the delta range innovation associated with the same satellite as the "Inno" data is also calculated by the processing unit 4. The covariance of the innovation is calculated as follows:

$$\text{Cov}_{inno} = H \cdot P \cdot H^T + R$$

with H being the observation matrix, P the state covariance matrix and R the observation error covariance.

The processing unit 4 implements a test on the "Inno" delta range innovation, in order to find out whether the signal received from the associated satellite has undergone a multi-path (step 108).

The test on the innovation 108 comprises the calculation by the processing unit 4 of a term being or dependent on a deviation between the "Inno" delta range innovation, and the associated covariance of the delta range innovation $\text{Cov}_{inno}$.

The term obtained is compared to a predefined threshold.

The processing unit 4 generates during the test step 108 a test result indicating whether the received satellite signal from which the measured delta range originates has or has not undergone a multi-path.

If the term is above the predefined threshold, this means that the innovation is not consistent with the associated covariance. The test result generated by the processing unit 4 is then positive, in the sense that this test result indicates that the received signal from which the measured delta range originates has undergone a multi-path.

In this first case, the pseudo-distance measured for the same satellite is not used as an observation by the Kalman filter to update the navigation state of the carrier device, during the update step.

If, on the contrary, the term is not greater than the predefined threshold, it is considered that the innovation is consistent with the associated covariance. The test result generated by the processing unit is then negative, in the sense that this test result indicates that the received signal from which the measured delta range originates has not undergone a multi-path.

In this second case, the processing unit calculates a second innovation associated with the satellite, relating to the measured pseudo-distance (step 110).

The processing unit then implements a test on the second innovation (step 112), following the same logic as the on described for the test on the delta range innovation (except that work is made here on pseudo-distances). This test on the second innovation produces a second test result indicating a level of likelihood of the measured pseudo-distance. This test forms part of the known operation of the Kalman filtering techniques.

If the second result indicates that the pseudo-distance is likely, then the measured pseudo-distance is used as an observation by the Kalman filter to update the navigation state of the carrier device, during the update step (step 114). Otherwise, the pseudo-distance is not used in this way (as in the case where the test result on the delta range innovation indicates a multi-path).

Ultimately, two conditions must be satisfied for a pseudo-distance measured for a satellite 3 to be used by the Kalman filter as an observation to update an a priori state vector: the first condition results from the test 108 on the delta range innovation achieved for the satellite 3, and the second condition results from the test 112 on the innovation relating to the pseudo-distance itself associated with the same satellite 3.

It is moreover advantageous to implement the test 112 on the innovation relating to the pseudo-distance only if the test result on the delta range innovation proves to be negative, for the purpose of computational savings.

It should be noted that steps 100 to 114 are repeated for signals emanating from different satellites. For example, let's consider the situation where N satellites are tracked. N pseudo-distances and N delta ranges are measured, N delta range innovations are calculated, each being tested.

The method described above may be subject to other variants. The pseudo-distance between the carrier device and a satellite, whose use is conditioned during the update step, can be replaced by another kinematic data associated with the satellite.

The invention claimed is:
1. A method comprising:
obtaining a measured delta range between a carrier device and a satellite and another measured kinematic data associated with the satellite, from a positioning signal emitted by the satellite then received by the carrier device,
generating an estimated delta range between the carrier device and the satellite, from position data of the carrier device and the satellite contained in a navigation state of the carrier device estimated by a Kalman filter,
calculating a delta range innovation associated with the satellite, from the estimated delta range and the measured delta range,
carrying out a test on the delta range innovation; producing a test result indicating whether or not the positioning signal has followed a multi-path,
using the measured kinematic data associated with the satellite as an observation by the Kalman filter to update the navigation state of the carrier device on condition that the test result indicates that the positioning signal has not followed a multi-path.

2. The method according to claim 1, wherein the measured kinematic data associated with the satellite is a pseudo-distance between the carrier device and the satellite.
3. The method according to claim 1, wherein the measured delta range is not used by the Kalman filter to update the navigation state of the carrier device.
4. The method according to claim 1, further comprising:
calculating a second innovation associated with the satellite, the second innovation relating to the measured kinematic data,
carrying out a test on the second innovation associated with the satellite, producing a second test result indicating a level of likelihood of the measured kinematic data, wherein using the measured kinematic data associated with the satellite as an observation by the Kalman filter to update the navigation state of the carrier device is conditioned to the second test result.
5. The method according to claim 4, wherein the test on the second innovation associated with the satellite is implemented only on condition that the test result indicates that the positioning signal has not followed a multi-path.
6. The method according to claim 1, wherein carrying out the delta range innovation test comprises:
calculating a term depending on a deviation between the delta range innovation associated with the satellite and a covariance of the delta range innovation associated with the satellite, and
making a comparison between the calculated term and a predefined threshold, wherein the test result depends on the comparison.
7. The method according to claim 1, wherein generating the estimated delta range comprises:
calculating a distance between the carrier device and the satellite at a time t, from position data of the carrier device and the satellite, contained in a navigation state of the carrier device associated with the time t,
making an inverse prediction by the Kalman filter from the navigation state of the carrier device at the time t, so as to obtain a navigation state of the carrier device associated with a time t−ΔT,
calculating a distance between the carrier device and the satellite at the time t−ΔT, from position data of the carrier device and the satellite, contained in the navigation state of the carrier device associated with the time t−ΔT,
calculating a deviation between the distance between the carrier device and the satellite at the time t, and the distance between the carrier device and the satellite at the time t−ΔT.
8. The method according to claim 1, wherein the Kalman filter implements a tight inertial/satellite coupling.
9. A non-transitory computer-readable medium comprising code instructions for causing a computer to perform the method as claimed in claim 1.
10. A navigation system comprising:
The non-transitory medium of claim 9,
a processing unit configured to execute the code instructions,
a receiver configured to receive the positioning signal.

* * * * *